United States Patent
Becke et al.

(10) Patent No.: US 6,303,718 B1
(45) Date of Patent: Oct. 16, 2001

(54) COMPOSITION BASED ON FLUORINE-CONTAINING METAL COMPLEXES

(75) Inventors: Sigurd Becke, Rösrath; Uwe Rosenthal, Rostock, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/397,936

(22) Filed: Sep. 17, 1999

(51) Int. Cl.$^7$ ..................................................... C08F 4/42
(52) U.S. Cl. ......................... 526/160; 526/132; 526/943; 526/348; 502/152
(58) Field of Search ..................................... 526/160, 132, 526/943, 348; 502/152

(56) References Cited

U.S. PATENT DOCUMENTS

| | | | |
|---|---|---|---|
| 2,827,446 | 3/1958 | Breslow | 260/94.9 |
| 3,080,305 | 3/1963 | Gorsich | 204/158 |
| 3,161,629 | 12/1964 | Gorsich | 260/94.9 |
| 3,576,763 | 4/1971 | Su | 252/431 |
| 4,542,199 | 9/1985 | Kaminsky et al. | 526/160 |
| 4,659,853 | 4/1987 | Fu et al. | 558/19 |
| 4,778,921 | 10/1988 | Lewellyn et al. | 560/137 |
| 4,871,705 | 10/1989 | Hoel | 502/117 |
| 5,145,819 | 9/1992 | Winter et al. | 502/117 |
| 5,173,201 | 12/1992 | Coffindaffer et al. | 252/8.8 |
| 5,229,478 | 7/1993 | Floyd et al. | 526/160 |
| 5,276,208 | 1/1994 | Winter et al. | 556/53 |
| 5,324,800 | 6/1994 | Welborn, Jr. et al. | 526/160 |
| 5,334,677 | 8/1994 | Razavi et al. | 526/114 |
| 5,580,939 | 12/1996 | Ewen et al. | 526/127 |
| 5,633,394 | 5/1997 | Welborne, Jr. et al. | 556/11 |
| 6,066,754 | 5/2000 | Kulkarni | 558/233 |
| 6,121,394 | * 9/2000 | Sugimoto et al. | 526/124.3 |

FOREIGN PATENT DOCUMENTS

| | | |
|---|---|---|
| 4332009 | 3/1995 | (DE) . |
| 277003 | 8/1988 | (EP) . |
| 277004 | 8/1988 | (EP) . |
| 308177 | 7/1992 | (EP) . |
| 0 705 849 * | 4/1996 | (EP) . |
| 427697 | 5/1996 | (EP) . |
| 468537 | 11/1996 | (EP) . |
| 0 834 515 | 4/1998 | (EP) . |
| 97/07141 | 2/1997 | (WO) . |
| 98/36004 | 8/1998 | (WO) . |
| 99/23124 | 5/1999 | (WO) . |
| 00/11047 | 3/2000 | (WO) . |

OTHER PUBLICATIONS

Herzog et al., Organometallics, 15, 909–917, 1996.*
Chemical Abstract, vol. 123, 1995, Ref. 143936d.

* cited by examiner

*Primary Examiner*—David W. Wu
*Assistant Examiner*—Ling-Siu Choi
(74) *Attorney, Agent, or Firm*—Joseph C. Gil; Noland J. Cheung

(57) ABSTRACT

The present invention relates to a catalyst system based on fluorine-containing metal complexes, particularly a catalyst system consisting of metallocene fluorides and aluminum alkyls, and relates to the use of said catalyst system for the polymerization of unsaturated compounds, particularly for the polymerization and copolymerization of olefins and/or dienes.

8 Claims, No Drawings

COMPOSITION BASED ON FLUORINE-CONTAINING METAL COMPLEXES

FIELD OF THE INVENTION

The present invention relates to a catalyst system based on fluorine-containing metal complexes, particularly a catalyst system consisting of metallocene fluorides and aluminum alkyls, and relates to the use of said catalyst system for the polymerization of unsaturated compounds, particularly for the polymerization and copolymerization of olefins and/or dienes.

BACKGROUND OF THE INVENTION

The use of metal cyclopentadienyl complexes for the polymerization of olefins and diolefins, particularly the use of metallocene complexes in admixture with activating co-catalysts, has long been known.

U.S. Pat. No. 2,827,446 describes a catalyst which is prepared from titanocene dichloride and diethylaluminum chloride for the polymerization of ethylene. However, this catalyst is unsuitable for industrial use, since first, the activity of the catalyst is too low and second, the polymerization of 1-olefins is not possible.

Highly effective, specific catalyst systems are known for the (co)polymerization of ethylene and/or 1-olefins. These catalysts consist of metallocene dichlorides in admixture with aluminoxanes, e.g. methylaluminoxane (MAO). In order to increase the activity and selectivity of the catalyst and in order to control the microstructure, molecular weight and molecular weight distribution of the products, a multiplicity of new metallocene catalysts or metallocene catalyst systems has been developed in recent years for the polymerization of olefinic compounds (e.g. EP 69,951, 129,368, 347,128, 347,129, 351,392, 485,821, 485,823). Chlorine-containing metallocenes are usually employed in combination with MAO.

Methods of polymerizing olefins are also known in which metallocene/aluminoxane catalysts (e.g. EP 308,177) are produced in situ.

In WO 97/07141, fluorine-containing semi-sandwich complexes of titanium are used in combination with MAO as catalysts for the production of polystyrene. WO 98/36004 describes fluorine-containing complexes, preferably of titanium, and preferably in combination with MAO, as catalysts for the production of polybutadiene.

However, the catalyst systems based on aluminoxanes, e.g. MAO, which were described above have disadvantages which are described in greater detail below. MAO is a mixture of different aluminum compounds, the number and structure of which are not known accurately. The polymerization of olefins with catalyst systems which contain MAO is therefore, not always reproducible. Moreover, MAO is not stable on storage and its composition changes under the effect of thermal stresses. MAO has the disadvantage of having to be used in considerable excess in order to achieve high catalyst activities and this results in a high content of aluminum in the polymer. MAO is also a cost-determining factor. Considerable excesses of MAO are uneconomic for industrial use.

In order to circumvent these disadvantages, aluminoxane-free polymerization catalysts have been developed in recent years. For example, Jordan, et al. in J. Am. Chem. Soc., Vol. 108 (1986), 7410 describe a cationic zirconocene-methyl complex which contains tetraphenylborate as a counterion and which polymerizes ethylene in methylene chloride.

EP-A 277,003 and EP-A 277,004 describe ionic metallocenes which are prepared by the reaction of metallocenes with ionizing reagents. EP-A 468,537 describes catalysts which possess an ionic structure and which are prepared by the reaction of metallocene dialkyl compounds with tetrakis (pentafluorophenyl)boron compounds. Ionic metallocenes are suitable as catalysts for the polymerization of olefins. One disadvantage, however, is the high sensitivity of these catalysts to impurities, such as moisture and oxygen, for example.

Prior art methods of preparing cationic metallocene complexes also have the disadvantage that the reagents which result in cation formation, e.g. tetrakis(pentafluorophenyl) boron compounds, are sometimes costly to synthesize, and the use thereof is expensive.

In addition, methods are known for the polymerization of olefins in which metallocene dialkyl compounds (EP 427, 697) or metallocene dichlorides (WO 92/01723), each in combination with aluminum alkyls and a third component, e.g. tris(pentafluorophenyl)boron compounds, are used as catalyst systems. Metallocene dichlorides or metallocene dialkyls in combination with aluminum alkyls alone, are not active with regard to polymerization.

SUMMARY OF THE INVENTION

The object of the present invention was to identify an aluminoxane-free composition which avoids the disadvantages of the prior art, and the use of which, despite this, enables high polymerization activities to be achieved. A further object was to identify an aluminoxane-free catalyst system for the production of polyolefin rubbers, particularly EP(D)M.

Surprisingly, it has now been found that catalyst systems based on fluorine-containing metal complexes are particularly suitable for achieving the aforementioned object.

DETAILED DESCRIPTION OF THE INVENTION

The present invention therefore relates to an aluminoxane-free catalyst system consisting of a) a fluorine-containing metal complex of formula (I)

$$A_a M F_b L_c \qquad (I)$$

wherein

M is a metal selected from the group consisting of zirconium, hafnium, vanadium, niobium and tantalum, A denotes an anionic ligand which is optionally singly- or multiply-bridged, F denotes a fluorine atom, L is a nonionic ligand, a is 1 or 2, b is 1, 2 or 3, and c is 0, 1, 2, 3 or 4, particularly 1, 2 or 3, wherein a+b=3 or 4 if M is zirconium or hafnium, a+b=3, 4 or 5 if M=vanadium, niobium or tantalum, and b) a compound of formula (II)

$$M'Y_3 \qquad (II)$$

wherein

M' denotes boron or aluminum, and

Y denotes entities which are the same or different, and represents hydrogen, a linear or branched $C_1$ to $C_{20}$ alkyl group which is optionally substituted by silyl groups, a linear or branched $C_1$ to $C_{10}$ fluoroalkyl group, a $C_6$ to $C_{10}$ fluoroaryl group, a $C_1$ to $C_{10}$ alkoxy group, a $C_6$ to $C_{20}$ aryl group, a $C_6$ to $C_{20}$ aryloxy group, a $C_7$ to $C_{40}$ arylalkyl group, or a $C_7$ to $C_{40}$ alkylaryl group, wherein trimethylaluminum is excluded.

Fluorine-containing metal complexes of formula (I) which are particularly suitable are those in which A is a pyrazolyl borate of formula $R^1B(N_2C_3R^2_3)_3$, an alcoholate or phenolate of formula $OR^1$, a thiolate of formula $SR^1$, an amide of formula $NR^1_2$, a siloxane of formula $OSiR^1_3$, an acetylacetonate of formula $(R^1CO)_2CR^1$, an amidinate of formula $R^1C(NR^1)_2$, a cyclooctatetraenyl of formula $C_8H_qR^1_{8-q}$ where q represents 0, 1, 2, 3, 4, 5, 6 or 7, a cyclopentadienyl of formula $C_5H_qR^1_{5-q}$ where q represents 0, 1, 2, 3,4 or 5, an indenyl of formula $C_9H_{7-r}R^1_r$ where r represents 0, 1, 2, 3, 4, 5, 6 or 7, a fluorenyl of formula $C_{13}H_{9-s}R^1_s$ where s represents 0, 1, 2, 3, 4, 5, 6, 7, 8 or 9, a $C_1$ to $C_{20}$ alkyl radical, a $C_6$ to $C_{10}$ aryl radical, or a $C_7$ to $C_{40}$ alkylaryl radical, wherein $R^1$ denotes entities which are the same or different, and represents hydrogen, a $C_1$ to $C_{20}$ alkyl group, a $C_6$ to $C_{10}$ fluoroaryl group, a $C_1$ to $C_{10}$ alkoxy group, a $C_6$ to $C_{20}$ aryl group, a $C_6$ to $C_{10}$ aryloxy group, a $C_2$ to $C_{10}$ alkenyl group, a $C_7$ to $C_{40}$ arylalkyl group, a $C_7$ to $C_{40}$ alkylaryl group, a $C_8$ to $C_{40}$ arylalkenyl group, a $C_2$ to $C_{10}$ alkynyl group, a silyl group which is optionally substituted by $C_1$–$C_{10}$ hydrocarbon radicals, a boryl group, an amino group or a phosphinyl group, or denote adjacent $R^1$ radicals which form a ring system with the atoms linking them, $R^2$ represents hydrogen or a $C_1$–$C_{10}$ alkyl group, and M, F, L and a, b, c have the meanings given above.

Examples of suitable nonionic ligands include ethers, thioethers, cyclic ethers, cyclic thioethers, amine or phosphines. Other examples of nonionic ligands include substituted or unsubstituted aromatic compounds, such as benzene, toluene, dimethylbenzene, trimethylbenzene, pentafluorobenzene, trifluoromethylbenzene, bis(trifluoromethyl)benzene, naphthalene, anthracene and fluorenes.

L preferably represents benzene, toluene, trimethylbenzene, naphthalene or anthracene.

The fluorine-containing metal complexes of formula (I) which are particularly preferred are those which comprise a cyclopentadienyl ring, which is optionally substituted, as a ligand, and fluorine atoms which are directly bonded to the metal atom M, wherein M represents zirconium or hafnium. Catalyst systems which comprise these catalyst components exhibit a good activity for polymerization.

M is preferably zirconium or vanadium, most preferably zirconium.

According to the present invention, a catalyst component is provided which contains at least one $R^3$ bridge between at least two ligands A.

$R^3$ is preferably

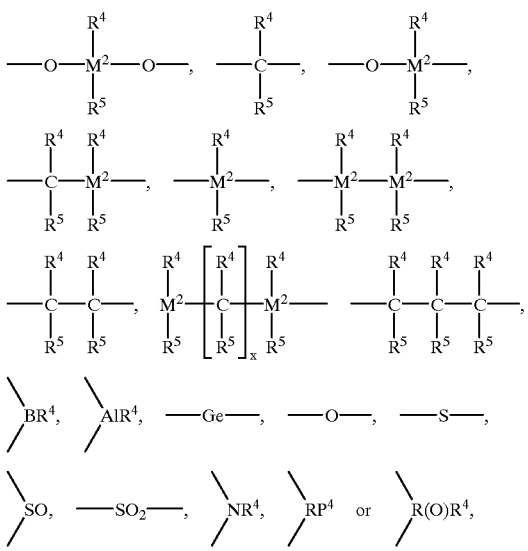

wherein $R^4$ and $R^5$ are the same or different and represent and a hydrogen atom, a halogen atom or a group which contains a $C_1$–$C_{40}$ hydrocarbon, such as a $C_1$–$C_{20}$ alkyl, a $C_1$–$C_{10}$ fluoroalkyl, a $C_1$–$C_{10}$ alkoxy, a $C_6$–$C_{14}$ aryl, a $C_6$–$C_{10}$ fluoroaryl, a $C_6$–$C_{10}$ aryloxy, a $C_2$–$C_{10}$ alkenyl, a $C_7$–$C_{40}$ aryalkyl, a $C_7$–$C_{40}$ alkylaryl, or a $C_8$–$C_{40}$ arylalkenyl group, or where $R^4$ and $R^5$ each form one or more rings with the atoms linking them and x is an integer from zero to 18, $M^2$ is silicon, germanium or tin; $R^3$ can also link two units of formula (I) to each other.

The following examples, which are not claimed to be complete, illustrate the organometallic fluorides which are particularly preferred in general formula (I):

ethylenebis(indenyl)zirconium difluoride;
ethylenebis(4,5,6,7-tetrahydroindenyl)zirconium difluoride;
ethylenebis(2-methylindenyl)zirconium difluoride;
ethylenebis(2,4-dimethylindenyl)zirconium difluoride;
dimethylsilandiylbis(2-methyl-4,5-benzoindenyl)zirconium difluoride;
dimethylsilandiylbis(2-methyl-4,6-diisopropylindenyl)zirconium difluoride;
dimethylsilandiylbis(2-methyl-4-phenylindenyl)zirconium difluoride;
dimethylsilandiylbis(2-ethyl-4-phenylindenyl)zirconium difluoride;
dimethylsilandiylbis(2-methyl-4-(naphthyl)indenyl)zirconium difluoride;
dimethylsilandiylbis(indenyl)zirconium difluoride;
dimethylsilandiylbis(2-methyl-4-ethylindenyl)zirconium difluoride;
dimethylsilandiylbis(2-methyl-4-isopropylindenyl)zirconium difluoride;
dimethylsilandiylbis(2-methyl-4-methylindenyl)zirconium difluoride;
dimethylsilandiylbis(2-ethyl-4-methylindenyl)zirconium difluoride;
dimethylsilandiylbis(2-methyl-α-acenaphth-1-indenyl)zirconium difluoride;
phenylmethylsilandiylbis(2-methyl-4-phenylindenyl)zirconium difluoride;
phenylmethylsilandiylbis(2-methyl-indenyl)zirconium difluoride;

ethylenebis(2-methyl-4,5-benzoindenyl)zirconium difluoride;
ethylenebis(2-methyl-4,6-diisopropylindenyl)zirconium difluoride;
ethylenebis(2-methyl-4-phenylindenyl)zirconium difluoride;
ethylenebis(2-ethyl-4phenylindenyl)zirconium difluoride;
ethylenebis(2-methyl-4-(1-naphthyl)indenyl)zirconium difluoride;
ethylenebis(indenyl)zirconium difluoride;
ethylenebis(2-methyl-4-ethylindenyl)zirconium difluoride;
ethylenebis(2-methyl-4-isopropylindenyl)zirconium difluoride;
ethylenebis(2-methyl-4-methylindenyl)zirconium difluoride;
ethylenebis(2-ethyl-4-methylindenyl)zirconium difluoride;
ethylenebis(2-methyl-α-acenaphth-1-indenyl)zirconium difluoride;
bis(2-methyl-4,5-benzoindenyl)zirconium difluoride;
bis(2-methyl-4,6-diisopropylindenyl)zirconium difluoride;
bis(2-methyl-4-phenylindenyl)zirconium difluoride;
bis(2-ethyl-4-phenylindenyl)zirconium difluoride;
bis(2-methyl-4-(1-naphthyl)indenyl)zirconium difluoride;
bis(indenyl)zirconium difluoride;
bis(2-methyl-4-ethylindenyl)zirconium difluoride;
bis(2-methyl-4-isopropylindenyl)zirconium difluoride;
bis(2-methyl-4-methylindenyl)zirconium difluoride;
bis(2-ethyl-4-methylindenyl)zirconium difluoride;
bis(2-methyl-α-acenaphth-1-indenyl)zirconium difluoride;
bis(n-butyl-cyclopentadienyl)zirconium difluoride;
bis(cyclopentadienyl)zirconium difluoride;
bis(pentamethylcyclopentadienyl)zirconium difluoride;
cyclopentadienylzirconium trifluoride;
pentamethylcyclopentadienyizirconium trifluoride;
(2-methyl-4,5-benzoindenyl)zirconium trifluoride;
(2-methyl-4,6-diisopropylindenyl)zirconium trifluoride;
(2-methyl-4-phenylindenyl)zirconium trifluoride;
(2-ethyl-4-phenylindenyl)zirconium trifluoride;
(2-methyl-4-(1-naphthyl)indenyl)zirconium trifluoride;
indenylzirconium trifluoride;
(2-methyl-4-ethylindenyl)zirconium trifluoride;
(2-methyl-4-isopropylindenyl)zirconium trifluoride;
(2-methyl-4-methylindenyl)zirconium trifluoride;
(2-ethyl-4-methylindenyl)zirconium trifluoride;
(2-methyl-α-acenaphth-1-indenyl)zirconium trifluoride;
(n-butyl-cyclopentadienyl)zirconium trifluoride;
isopropylidene(9-fluorenyl)cyclopentadienylzirconium trifluoride;
diphenylmethylene(9-fluorenyl)cyclopentadienylzirconium difluoride;
phenylmethylmethylene(9-fluorenyl)cyclopentadienylzirconium difluoride;
dimethylsilandiyl(9-fluorenyl)cyclopentadienylzirconium difluoride;
isopropylidene(9-fluorenyl)(3-methyl-cyclopentadienyl)zirconium trifluoride;
diphenylmethylene(9-fluorenyl)(3-methyl-cyclopentadienyl)zirconium difluoride;
phenylmethylmethylene(9-fluorenyl)(3-methyl-cyclopentadienyl)zirconium difluoride;
dimethylsilandiyl(9-fluorenyl)(3-methyl-cyclopentadienyl)zirconium difluoride;
isopropylidene(9-fluorenyl)(3-isopropyl-cyclopentadienyl)zirconium difluoride;
diphenylmethylene(9-fluorenyl)(3-isopropyl-cyclopentadienyl)zirconium difluoride;
phenylmethylmethylene(9-fluorenyl)(3-isopropyl-cyclopentadienyl)zirconium difluoride;
dimethylsilandiyl(9-fluorenyl)(3-isopropyl-cyclopentadienyl)zirconium difluoride;
isopropylidene(2,7-di-tert.-butyl-9-fluorenyl)cyclopentadienylzirconium difluoride;
diphenylmethylene(2,7-di-tert.-butyl-9-fluorenyl)cyclopentadienylzirconium difluoride;
phenylmethylmethylene(2,7-di-tert.-butyl-9-fluorenyl)cyclopentadienylzirconium difluoride;
dimethylsilandiyl(2,7-di-tert.-butyl-9-fluorenyl)cyclopentadienylzirconium difluoride;
ethylenebis(indenyl)hafnium difluoride;
ethylenebis(4,5,6,7-tetrahydroindenyl)hafnium difluoride;
ethylenebis(2-methylindenyl)hafnium difluoride;
dimethylsilandiylbis(indenyl)hafnium difluoride;
bis(indenyl)hafnium difluoride;
bis(cyclopentadienyl)hafnium difluoride;
bis(pentamethylcyclopentadienyl)hafnium difluoride;
cyclopentadienylhafnium trifluoride;
pentamethylcyclopentadienylhafnium trifluoride;
indenylhafnium trifluoride;
(n-butyl -cyclopentadienyl)hafnium trifluoride; and
isopropylidene(9-fluorenyl)cyclopentadienylhafnium difluoride.

Metallocene fluorides can be prepared as described in J. Chem. Soc. (A), 1969, 2106–2116, for example.

Examples of compounds of formula (II) which are particularly suitable include triethylaluminum, diethylaluminum hydride, triisobutylaluminum, diisobutyl-aluminum hydride, triisohexylaluminum, tris-(2,3,3-trimethyl-butyl)aluminum, tris-(2,3-dimethylhexyl)aluminum, tris-(2,3-dimethyl-butyl)aluminum, tris-(2,3-dimethylpentyl)aluminum, tris-(2,3-dimethyl-heptyl)aluminum, tris-(2-methyl-3-ethylpentyl)aluminum, tris-(2-methyl-3-ethyl-hexyl)aluminum, tris-(2-methyl-3-ethylheptyl)aluminum, tris-(2-methyl-3-propyl-hexyl)aluminum, tris-(2-ethyl-3-methylbutyl)aluminum, tris-(2-ethyl-3-methyl-pentyl)aluminum, tris-(2,3-diethyl-pentyl)aluminum, tris-(2-propyl-3-methyl-butyl)aluminum, tris-(2-iso-propyl-3-methyl-butyl)aluminum, tris-(2-isobutyl-3-methyl-pentyl)aluminum, tris-(2,3,3-trimethyl-pentyl)aluminum, tris-(2,3,3-trimethyl-hexyl)aluminum, tris(2-ethyl-3,3-dimethyl-butyl)aluminum, tris-(2-ethyl-3,3-dimethyl-pentyl)aluminum, tris-(2-isopropyl-3,3-dimethyl-butyl)aluminum, tris-(2-trimethylsilylpropyl)aluminum, tris-(2-methyl-3-phenyl-butyl)aluminum, tris-(2-ethyl-3-phenyl-butyl)aluminum, tris-(2,3-dimethyl-3-phenylbutyl)-aluminum, tri-(2-phenylpropyl)aluminum, tribenzyl-aluminum, triphenyl-aluminum, tri(neopentyl)aluminum, and tri(trimethylsilylmethyl)aluminum. Triisobutylaluminum and tri-(2,4,4-trimethylpentyl)-aluminum are particularly preferred. The compounds of formula (II) may also be present as mixtures.

Trialkylaluminum compounds and dialkylaluminum hydrides can be repared by the method described in Liebigs Annalen der Chemie, Volume 29, pages 14–19.

The present invention further relates to the use of the new catalyst systems for the polymerization of unsaturated compounds, particularly of olefins and dienes. In this respect, polymerization should be understood to include both homo- and copolymerization of said unsaturated compounds. Substances, which are used in particular for polymerization include $C_2$–$C_{10}$ alkenes such as ethylene, propylene, butene-1, pentene-1, hexene-1, octene-1 and isobutylene, and arylalkenes such as styrene. The following substances are used in particular as dienes: conjugated dienes such as 1,3-butadiene, isoprene or 1,3-pentadiene, and unconjugated dienes such as 1,4-hexadiene, 1,5- heptadiene, 5,7-dimethyl-1,6-octadiene, 7-methyl-1,6-octadiene, 4-vinyl-1-cyclohexene, 5-ethylidene-2-norbornene, 5-vinyl-2-norbornene and dicyclopentadiene.

The catalysts according to the present invention are suitable for the production of rubbers based on copolymers of ethylene with one or more of the aforementioned α-olefins and the aforementioned dienes. The catalyst system according to the invention is also suitable for the polymerization of cyclo-olefins such as norbornene, cyclopentene, cyclohexene or cyclooctane, and for the copolymerization of cycloolefins with ethylene or α-olefins.

Polymerization can be conducted in a liquid phase, in the presence or absence of an inert solvent, or in the gas phase. Suitable solvents include aromatic hydrocarbons such as benzene and/or toluene, or aliphatic hydrocarbons such as propane, hexane, heptane, octane, isobutane, cyclohexane or mixtures of different hydrocarbons.

It is possible to use the catalyst system according to the present invention on a support. Examples of suitable support materials include: inorganic or organic polymeric supports such as silica gel, zeolites, carbon black, activated carbon, alumina, polystyrene and polypropylene.

The support materials are preferably thermally and/or chemically pretreated in order to adjust the water content or concentration of OH groups to defined values or to keep them as low as possible. Chemical pretreatment may consist of the reaction of the support with an aluminum alkyl, for example. Inorganic supports are usually heated at 100° C. to 1000° C. for 1 to 100 hours before use. The surface of inorganic supports such as these, particularly of silica ($SiO_2$), ranges between 10 and 100 $m^2/g$, preferably between 100 and 800 $m^2/g$. The particle diameter ranges between 0.1 and 500 micrometer ($\mu$), preferably between 10 and 200 $\mu$.

Polymerization is generally conducted at pressures of 1 to 1000, preferably 1 to 100 bar. Polymerization can be conducted in customary reactors, continuously or batch-wise.

For economic reasons, the pressures employed do not often exceed the value of 30 bar, preferably 20 bar. According to the present invention, polymerization is conducted in one or more reactors or reaction zones, e.g. in a reactor cascade. If a plurality of reactors is used, different polymerization conditions can be employed.

Polymerization is generally effected at temperatures within the range from 0° C. to 200° C., preferably from 20° C. to 150° C., most preferably from 40° C. to 120° C.

The molar ratio of polymerizable monomer to the compound of formula (I) falls within the range from $1 \times 10^{10}:1$ to 100:1, preferably from $1 \times 10^8:1$ to 1000:1.

The molar ratio of the compound of formula (II) to the compound of formula (I) falls within the range from 10,000:1 to 0.1:1, preferably from 1000:1 to 1:1.

The polymers which are obtainable by the method according to the present invention are primarily suitable for the production of moldings of all types.

The invention is explained in greater detail with reference to the following examples.

EXAMPLES

General information: The preparation and manipulation of organometallic compounds, as well as the polymerization experiments, were conducted with the exclusion of air and moisture using argon as a protective gas (Schlock technique). All necessary solvents were rendered absolute before use by boiling for several hours over a suitable drying agent, followed by distillation under argon.

Polymer characterization: the intrinsic viscosity was determined in an Ubbelohde capillary viscometer at 140° C. in o-dichlorobenzene as the solvent (multi-point measurement). DSC measurements were made using an apparatus supplied by Perkin-Elmer termed a DSC-2 differential scanning calorimeter, using the following procedure: two heating runs from −90° C. to +180° C. at a heating rate of 20 K/min, rapid cooling at 320 K/min to −90° C., flushing with nitrogen, weighing 12.3 mg of sample into standard capsules. Determination of the polymer composition by IR spectroscopy was effected according to ASTM D 3900.

Example 1

Polymerization of Ethylene 500 ml toluene and 0.5 ml tris-(2,4,4-trimethylpentyl) aluminum were placed in a 1.4 liter steel autoclave. This solution was heated to a controlled temperature of 60° C. Ethylene was then metered in until the reactor internal pressure rose to 7 bar. Polymerization was initiated by adding a mixture of 2.5 $\mu$mol ethylenebis(tetrahydroindenyl) zirconium difluoride and 0.5 ml tris-(2,4,4-trimethylpentyl) aluminum, dissolved in 5 ml toluene. After a polymerization period of 10 minutes at 60° C. and 7 bar, the autoclave was depressurized, and the polymer was washed with methanol and dried for 20 hours under vacuum at 60° C. 13.2 g polyethylene were obtained.

Example 2

(Comparative Example A)

Polymerization of Ethylene

The polymerization experiment of Example 1 was repeated, except that the fluorine-free compound ethylenebis(tetrahydroindenyl)zirconium dichloride was used instead of ethylenebis(tetrahydroindenyl)zirconium difluoride. No polymerization occurred.

Example 3

Copolymerization of Ethylene and Propylene 500 ml toluene and 0.3 ml triisobutylaluminum (TIBA) were placed in a 1.4 liter steel autoclave which was fitted with a mechanical stirrer, a manometer, a temperature sensor, a temperature controller, a catalyst lock and with monomer metering devices for ethylene and propylene. The internal temperature was set to 60° C. using a thermostat. 10 g ethylene and 22 g propylene were subsequently added. Polymerization was initiated by adding as solution of 1.25 $\mu$mol ethylenebis(tetrahydroindenyl)-zirconium difluoride in 1.25 ml toluene. Ethylene and propylene were continuously added in a quantitative ratio 30:70 so that the internal pressure at 60° C. remained constant at 7 bar. After a polymerization period of 20 minutes, the reaction was stopped, and the polymer was precipitated in methanol, isolated and dried for 20 hours at 60° C. under vacuum. 19.0 g of a copolymer were obtained which had the following composition: 79.3% by weight ethylene, 20.7% by weight propylene (determined by IR spectroscopy). Measurement of the intrinsic viscosity gave a value of 4.45 dl/g.

Example 4

(Comparative Example B)

Copolymerization of Ethylene and Propylene

The polymerization experiment of Example 3 was repeated, except that a 1.0 ml of a 2.0 molar solution of trimethylaluminum in toluene was used instead of 0.3 ml TIBA. No polymerization occurred.

Example 5

(Comparative Example C)
Copolymerization of Ethylene and Propylene

The polymeratization experiment of Example 3 was repeated, except that a 1.0 ml of a 2.0 molar solution of diisobutylaluminum chloride in toluene was used instead of 0.3 ml TIBA No. polymerization occurred.

Example 6
Terpolymerization of Ethylene, Propylene and 5-ethylidene-2-norbornene (ENB)

500 ml toluene, 1 ml TIBA and 5 ml ENB were placed in a 1.4 liter steel autoclave which was fitted with a mechanical stirrer, a manometer, a temperature sensor, a temperature controller, a catalyst lock and with monomer metering devices for ethylene and propylene. The internal temperature was set to 60° C. using a thermostat. 11 g ethylene and 25 g propylene were subsequently added. Polymerization was initiated by adding as solution of 1.25 µmol ethylenebis (tetrahydroindenyl)zirconium difluoride and 0.25 ml TIBA, dissolved in 5 ml toluene. Ethylene and propylene were continuously added in a quantitative ratio 30:70 in a semi-batch procedure so that the internal pressure at 60° C. remained constant at 7 bar. After a polymerization period of 40 minutes, the reaction was stopped, and the polymer was precipitated in methanol, isolated and dried for 20 hours at 60° C. under vacuum. 37.3 g of a terpolymer were obtained which had the following composition: 64.2% by weight ethylene, 28.7% by weight propylene and 7.8% by weight ENB (determined by IR spectroscopy). DSC investigation gave a glass transition temperature $T_g=-48°$ C.

Example 7

(Comparative Example D)
Terpolymerization of Ethylene, Propylene and 5-ethylidene-2-norbornene (ENB)

The polymerization experiment of Example 3 was repeated, except that the fluorine-free compound ethylenebis (tetrahydroindenyl)zirconium dichloride was used instead of ethylenebis(tetrahydroindenyl)zirconium difluoride. No polymerization occurred.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aluminoxane-free catalyst system comprising
    a) a fluorine-containing metal complex of formula (I)

$$A_aMF_bL_c \quad \text{(I)}$$

wherein
    M is a metal selected from the group consisting of zirconium, hafnium, vanadium, niobium and tantalum,
    A denotes an anionic ligand which is optionally singly- or multiply-bridged,
    F denotes a fluorine atom,
    L is a nonionic ligand,
    a is 1 or 2,
    b is 1, 2 or 3, and
    c is 0, 1, 2, 3 or 4,
    wherein a+b=3 or 4 if M is zirconium or hafnium; a+b=3, 4 or 5 if M=vanadium, niobium or tantalum, and
    b) a compound of formula (II)

$$M'Y_3 \quad \text{(II)}$$

wherein
    M' denotes boron or aluminum, and
    Y denotes entities which are the same or different, and represents hydrogen, a linear or branched $C_1$ to $C_{20}$ alkyl group which is optionally substituted by silyl groups, a linear or branched $C_1$ to $C_{10}$ fluoroalkyl group, a $C_6$ to $C_{10}$ fluoroaryl group, a $C_1$ to $C_{10}$ alkoxy group, a $C_6$ to $C_{20}$ aryl group, a $C_6$ to $C_{20}$ aryloxy group, a $C_7$ to $C_{40}$ arylalkyl group, or a $C_7$ to $C_{40}$ alkylaryl group,
    wherein $M'Y_3$ is not trimethylaluminum.

2. A catalyst system according to claim 1, wherein M presents vanadium or zirconium.

3. A catalyst system according to claim 1, wherein A represents a cyclopentadienyl ring which is optionally substituted.

4. A catalyst system according to claim 1, wherein $M'Y_3$ represents triethylaluminum, diisobutylaluminum hydride, triisobutylaluminum or tri-(2,4,4-trimethylpentyl) aluminum.

5. A catalyst system according to claim 1, wherein c is 1, 2, 3 or 4, and L represents a substituted or unsubstituted aromatic compound.

6. A method for the polymerization of α-olefins or mixtures of α-olefins and optionally, of dienes, wherein polymerization is effected in the presence of a catalyst system comprising
    a) a fluorine-containing metal complex of formula (I)

$$A_aMF_bL_c \quad \text{(I)}$$

wherein
    M is a metal selected from the group consisting of zirconium, hafnium, vanadium, niobium and tantalum,
    A denotes an anionic ligand which is optionally singly- or multiply-bridged,
    F denotes a fluorine atom,
    L is a nonionic ligand,
    a is 1 or 2,
    b is 1, 2 or 3, and
    c is 0, 1, 2, 3 or 4,
    wherein a+b=3 or 4 if M is zirconium or hafnium; a+b=3, 4 or 5 if M=vanadium, niobium or tantalum, and
    b) a compound of formula (II)

$$M'Y_3 \quad \text{(II)}$$

wherein
    M' denotes boron or aluminum, and
    Y denotes entities which are the same or different, and represents hydrogen, a linear or branched $C_1$ to $C_{20}$ alkyl group which is optionally substituted by silyl groups, a linear or branched $C_1$ to $C_{10}$ fluoroalkyl group, a $C_6$ to $C_{10}$ fluoroaryl group, a $C_1$ to $C_{10}$ alkoxy group, a $C_6$ to $C_{20}$ aryl group, a $C_6$ to $C_{20}$ aryloxy group, a $C_7$ to $C_{40}$ arylalkyl group, or a $C_7$ to $C_{40}$ alkylaryl group,
    wherein $M'Y_3$ is not trimethylaluminum.

7. A method according to claim 6, wherein polymerization is effected in the presence of an aromatic hydrocarbon.

8. A method according to claim 6, wherein the catalyst system is used in supported form.

* * * * *